United States Patent [19]

Blackwell et al.

[11] Patent Number: 6,005,014
[45] Date of Patent: Dec. 21, 1999

[54] APPARATUS AND PROCESS FOR PRODUCING POLYMERIC FOAM

[75] Inventors: James Brian Blackwell, Prestbury; Geoffrey Buckley, Shaw; John James Blackwell, Poynton; Stephen William Blackwell, Macclesfield, all of United Kingdom

[73] Assignee: Beamech Group Limited, United Kingdom

[21] Appl. No.: 08/981,984

[22] PCT Filed: Jul. 8, 1996

[86] PCT No.: PCT/GB96/01686

§ 371 Date: Mar. 30, 1998

§ 102(e) Date: Mar. 30, 1998

[87] PCT Pub. No.: WO97/02938

PCT Pub. Date: Jan. 30, 1997

[30] Foreign Application Priority Data

Jul. 11, 1995 [GB] United Kingdom ............ 9514097
Jul. 12, 1995 [GB] United Kingdom ............ 9514192
May 24, 1996 [GB] United Kingdom ............ 9611004

[51] Int. Cl.⁶ .................................. C08J 9/04
[52] U.S. Cl. .............. 521/79; 264/45.9; 264/50; 264/51; 264/176.1; 264/211; 264/211.21; 425/4 R; 425/4 C; 425/190; 521/80; 521/917
[58] Field of Search .................. 425/4 R, 4 C, 425/190; 264/45.9, 50, 51, 176.1, 211, 211.21; 521/79, 80, 917

[56] References Cited

U.S. PATENT DOCUMENTS

| | | |
|---|---|---|
| 2,763,475 | 9/1956 | Dennis . |
| 3,108,976 | 10/1963 | Knox et al. . |
| 3,181,199 | 5/1965 | Voelker . |
| 3,184,419 | 5/1965 | Merriman . |
| 3,256,218 | 6/1966 | Knox . |
| 3,316,335 | 4/1967 | Snella et al. . |
| 4,297,860 | 11/1981 | Pacifici et al. . |
| 4,337,318 | 6/1982 | Doyle ....................... 521/80 |
| 4,906,672 | 3/1990 | Stone et al. ................ 521/130 |
| 5,055,272 | 10/1991 | Wheeler et al. . |
| 5,120,770 | 6/1992 | Doyle et al. ............... 521/99 |
| 5,124,366 | 6/1992 | Gluck et al. ............... 521/99 |
| 5,411,389 | 5/1995 | Kellerhof et al. ........... 425/4 C |
| 5,643,970 | 7/1997 | Sulzbach et al. ........... 521/155 |

FOREIGN PATENT DOCUMENTS

| | | |
|---|---|---|
| 077653 | 4/1983 | European Pat. Off. . |
| WO9602376 | 2/1996 | European Pat. Off. . |
| WO9616782 | 6/1996 | European Pat. Off. . |
| 5286048 | 11/1993 | Japan . |
| WO9216363 | 10/1992 | WIPO . |
| WO9602377 | 2/1996 | WIPO . |

*Primary Examiner*—John M. Cooney, Jr.
*Attorney, Agent, or Firm*—Christie, Parker & Hale LLP

[57] ABSTRACT

An apparatus and process for producing polymeric foam, wherein reactive foam components and a low-boiling point frothing agent are brought together, sufficient pressure is applied to maintain the frothing agent in a liquid state and the mixture is passed through a permeable discharge head through which the mixture is discharged and wherein the pressure is reduced and froth is formed. The discharge head comprises one or more diffuser elements (80) having a structure such as to require division, divergence and convergence of flow paths in three dimensions within the axial thickness of the diffuser element, considered in the direction of flow therethrough. The diffuser element (80) is made of bonded, or sintered or sintered composite material, such as sintered wire.

19 Claims, 9 Drawing Sheets

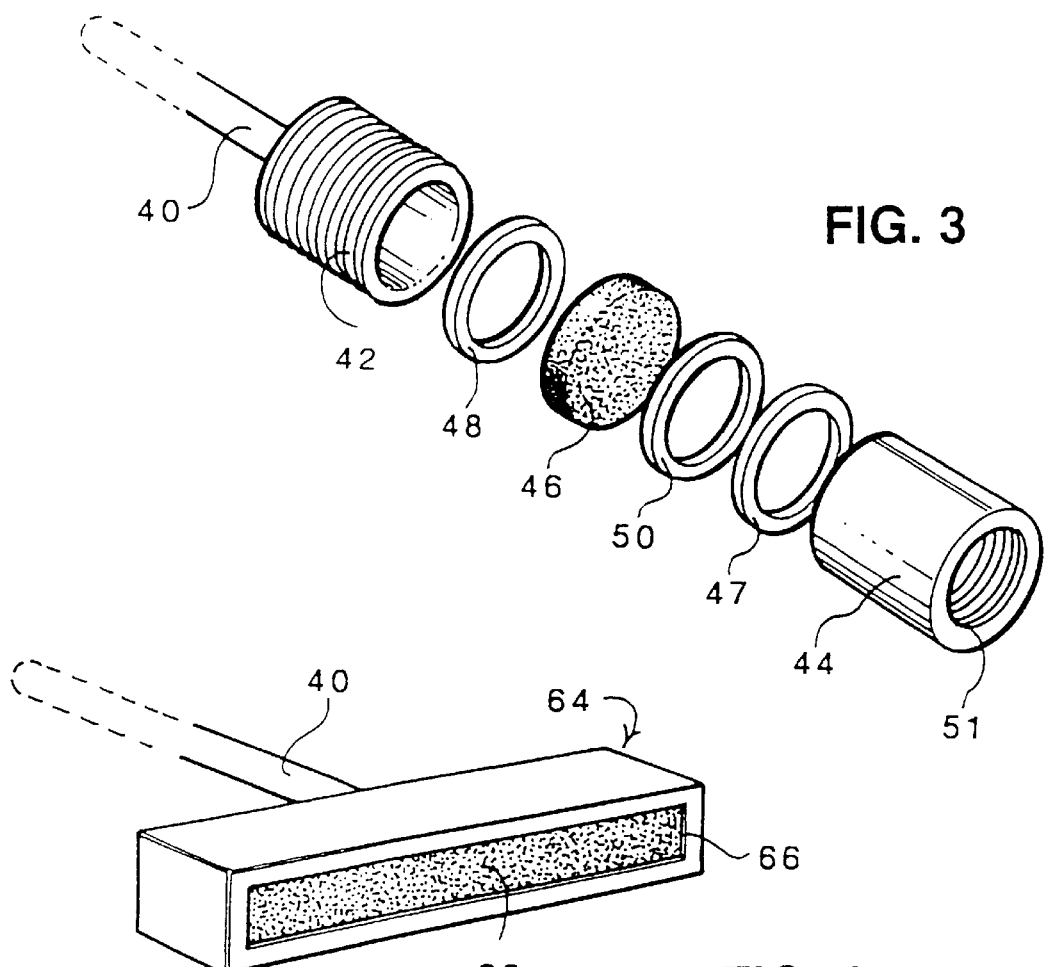
FIG. 3
FIG. 4
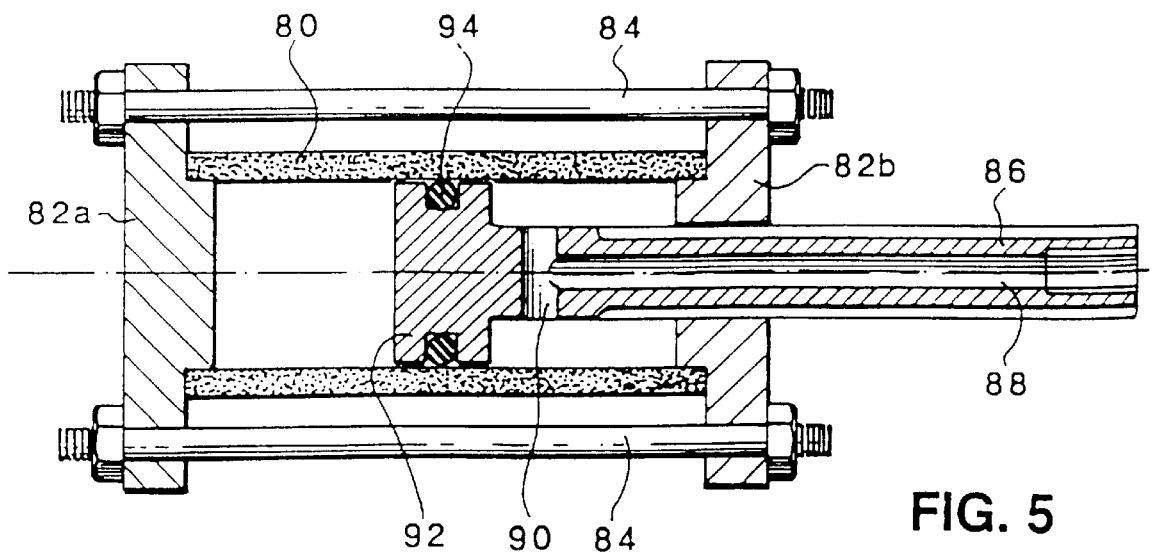
FIG. 5

APPARATUS AND PROCESS FOR PRODUCING POLYMERIC FOAM

The present invention relates to an apparatus and process for producing polymeric foam and in particular, but not exclusively, to an apparatus and process for the continuous production of low-density polymeric foam.

The preparation of polymeric foams has conventionally required the mixing or several components which react to form a foamed polymer. Typically, the components include a polyol, an isocyanate, a catalyst or catalysts, a surfactant and water. When these components are mixed together in the correct proportions, the water reacts with the isocyanate to produce carbon dioxide for expansion of the polymer.

By discharging a layer of the mixture onto a moving conveyor (with a movable base and with adjustable opposed side walls) the components of the mixture react and continuously produce a polymeric foam.

More recently, the continuous production of low density foams has involved the use of a relatively inert, low boiling point liquid which is mixed under pressure in a liquid state with the other chemical components in order to provide an auxiliary blowing action on the mixture before the mixture expands by production of carbon dioxide from the isocyanate/water reaction. The mixture is discharged onto the conveyor and the vaporised low-boiling point liquid expands the reaction mixture which then subsequently expands by the chemical production of carbon dioxide from the reaction mixture to form a polymeric foam.

Suitable blowing/frothing agents include the various chlorofluorocarbons (CFCs). Although CFCs have the desired inertness and relatively low boiling point, their use has recently been discouraged on environmental considerations since it is believed that CFCs contribute to depletion of the ozone layer. A suitable replacement for CFCs is carbon dioxide but since carbon dioxide vaporises at a much lower temperature than CFCs, and indeed must be pressurised in order to exist as a liquid, relatively high pressures have been maintained throughout the apparatus and method.

However, unless the vaporisation of the carbon dioxide occurs under controlled conditions, some of it can be lost and the efficiency of the foam expansion is reduced and poor quality foam may be produced, with non-uniform cell structure and voids or "pin-holes".

The apparatus described in EP-A-0645226 attempts to discharge the reaction mixture under controlled conditions by discharging the mixture through an elongate pressure-drop zone to initiate frothing, flowing the frothing mixture along a frothing cavity and through an outlet aperture and subsequently discharging the frothing mixture onto a substrate.

In published WO 96/00644, it is proposed to expand a foamable reactive mixture into a large number of individual flows at shear rates of above 500/sec. This is sought to be achieved by passing the reactive mixture through one or more separate fine meshed screens having a screen size from 0.025 to 0.3 mm. The "screens" envisaged in WO 96/00644 comprise apertured discs or nets, ie. having simple direct paths therethrough. The various embodiments shown by way of example in WO 96/00644 all use separate, multiple fine-meshed screens which are held apart axially by respective spacers so as to have a clear space therebetween. This appears to have the likely disadvantage that, due to the individual pressure drops across these screens, some foaming is likely to take place in the spaces between the screens which would be highly undesirable in practice.

The "reactive mixture" which is used in the technique disclosed and claimed in WO 96/00644 is obtained, using at least two reactive components and carbon dioxide as expanding agent, by mixing at least one of the reactive components with carbon dioxide under pressure, thereby producing a mixture containing liquid carbon dioxide, and then mixing the resultant mixture with the other reactive component to form the foamable reactive mixture. The latter mixing steps are typically carried out in a static mixer and rotary mixing head, respectively.

The latter system relies on having a fully mixed "reactive mixture" upstream of the fine-mesh screen(s) since, because the flow of mixture through the screen apertures is essentially unidirectional, ie. perpendicular to the screen plane, no significant mixing takes place within the screen apertures themselves.

It is a first object of the present invention to provide an apparatus and process for producing polymeric foam which provides a very controlled pressure drop and thereby enables the production of uniformly high quality foam having an improved cell structure.

In accordance with a first aspect of the present invention, there is provided an apparatus for producing polymeric foam, wherein reactive foam components and a low-boiling point frothing agent are brought together, sufficient pressure is applied to maintain the frothing agent in a liquid state, and the mixture is passed through a permeable discharge head through which the mixture is discharged and wherein the pressure is reduced and froth is formed, characterised in that the discharge head comprises at least one diffuser element having a structure such as to require division, divergence and convergence of flow paths in three dimensions within the axial thickness of the diffuser element, considered in the direction of flow therethrough.

It has been found that by discharging the mixture through such a diffuser element, the mixture is subjected to mixing and/or spreading during its passage therethrough and the resultant foam is very uniform in nature, is of high quality and is relatively free from irregularities such as voids or pin holes. Advantageously, the diffuser element comprises a liquid and/or gas permeable diffusing material.

Preferably, the diffuser element is made of a bonded or sintered material or a sintered composite. The bonded or sintered material is preferably a metal such as stainless steel, but could alternatively comprise other bondable or sinterable materials such as plastics and ceramics or other particulate materials such as carbon, silica, alumina and glass. Although a sintered material formed from spherical particles does work adequately, the variation in particle size for a given grade of sintered material is such that it can be difficult to obtain the desired control in the vaporisation of the frothing agent. However, the dimensions and tolerances of sintered or bonded wire are superior to those of sintered spherical particles and thus sintered wire has been found to be particularly good for use as the diffuser element. Sintered wire mesh is typically formed in sheets by rolling and sintering two or more layers of wire mesh such that contact points of the mesh are fused together during the sintering process.

A "bonded" material is one where individual particles or strands are joined together at contact points by fusing, adhesive or other bonding agent.

The pressure of the reactant mixture with the $CO_2$ prior to the diffuser element should be greater than the equilibrium pressure of the mixture. For example, if the equilibrium pressure is between 8 to 15 Bar, we have found that using a sintered material with an average micron rating of about 20, and with a pressure of the reactant mixture before the sinter of 16 Bar to 30 Bar, produces a homogeneous froth and subsequently foams of acceptable quality.

In one experiment with a flow rate of 14 Kg per minute of mixed reactants and $CO_2$ with an approximate viscosity of 400–600 cps (centipoises/sec) at 20° C., a sintered material with an average micron range of 20, a diameter of 30 mm, and a thickness so 1.32 mm, produces a homogeneous froth and a foam of acceptable quality. In practice, the pore size of typical conventional sintered materials can vary widely. For example in one sintered material of average pore size of 20 microns, the stated range of pore size is between 7.5 and 85 microns. The larger pore sizes can give rise to defects in the foam, the smaller pore sizes can give blockages in the sintered element. For the present purposes the sintered material should be structured such that the variation in the pore size for the majority of pores should preferably be between −30% and +50% of the average pore size.

In a further experiment, with a flow rate of 14 Kg per minute of the mixed reactants and $CO_2$, and with an approximate viscosity of 400–600 cps at 20° C. and with a sintered material having an average micron rating of 100, a diameter of 15 mm and thickness of 1.5 mm, the resultant foam was not of acceptable quality as it contained numerous holes.

Thus, the preferred foaming device of the present invention comprises a discharge head which includes a pressure reduction device in the form of a permeable diffuser element through which the components of the foam are discharged. The permeable diffuser element comprises an assembly of fused, bonded or sintered elements, being either particles of metallic, ceramic, plastics, or other material, or comprises the fusion of a multiplicity of meshes, or simply comprises a mass of loose, particulate material contained between permeable support plates.

All such examples have the common characteristic that there is no simple individual "straight-through" path through the diffuser material (as there is in the case of the screen mesh of WO 96/00644) but rather there is division, divergence and convergence of flow paths within the thickness of the diffuser element. As a result, the reactive constituents or mixture cannot take a "straight-through" path but are/is caused to be split into a multiplicity of flows, whereby the constituent components are subjected to mixing or additional mixing if already pre-mixed, during their passage through the diffuser element and the resultant foam has a high quality cell structure relatively free from irregularities such as voids or pin holes.

Another way to consider this distinctive feature of the diffuser element of the present invention is that the possibility exists for flow through the diffuser element in three dimensions (x, y and z) as compared to just one (x) in the case of an arrangement using a perforated disc or screen mesh such as that of WO 96/00644. This 3-dimensional flow through the diffuser element, such as exemplified by the preferred sintered material, provides mixing of the components within the sintered material. This provides the surprising result that the ability is acquired to reduce or even avoid additional mixing using the conventional static mixer to blend the polyol with the $CO_2$ and also the second mixer where the polyol/$CO_2$ blend normally meets and mixes with the other reactants prior to discharge through the foaming head.

Our surprising discovery is that the diffuser element functions both as a mixer for the reactants and $CO_2$, reducing the amount of mechanical (rotational) mixing required, and at the same time as a means of controlling without violent explosion the change of state of the liquid $CO_2$ to gaseous $CO_2$, giving a homogeneous froth.

It has been found that the present foaming device can remove the necessity for the constituent reactive components and $CO_2$ to be pre-mixed in a specially provided mixer before being presented together to the diffuser element at the discharge head—although they can be so pre-mixed if desired. The present system further allows the reactive components to be simply brought together, along with the $CO_2$, upstream of or at the diffuser element.

In all cases, it is essential that the $CO_2$ is kept in the liquid phase throughout the whole of the process up to the final pressure reduction to atmospheric conditions which occurs at the downstream side of the diffuser element otherwise poor quality foam with holes will be produced.

Thus, an added advantage of using a diffuser element of the present invention in the discharge head is that much less mixing of the components can be required before being fed to the discharge head since at least some mixing and/or spreading occurs during the progress of the mixture through the diffuser element. In the prior art, it is common for the components to be mixed together in a rotary mixer operating at a speed of several hundred and up to several thousand rpm, in order to ensure that the components are mixed intimately. By discharging the mixture through a diffuser element in accordance with the present invention it has been possible to produce a foamed polymer by operating a rotary mixer for the components at a speed of less than 40 rpm., thereby avoiding the potential problem of dissolved gases coming out of solution and causing product defects. Indeed, as explained hereinbefore, it has been found that it is possible in some cases to dispose of the rotary mixer complete if desired.

The diffuser element of the present invention may be any of a wide variety of shapes. For example, in one embodiment, the diffuser element is circular. In another embodiment, the diffuser element is laterally elongate and is arranged transversely with respect to a moving substrate or carrier, so that the foam mixture is discharged evenly across the width of the substrate. The diffuser element can be fixed in position. In other embodiments, it can be arranged to be traversed across the width of the substrate at controlled speeds.

Advantageously, the frothing agent comprises carbon dioxide.

In accordance with a second aspect of the present invention, a process for producing polymeric foam comprises bringing together reactive foam components and a low-boiling point frothing agent, applying pressure to maintain the frothing agent in a liquid condition and discharging the components through a permeable discharge head to form a froth, the discharge head comprising at least one diffuser element having a structure which causes division, divergence and convergence of flow paths within the axial thickness of the diffuser element, considered in the direction of flow therethrough.

Preferably, the diffuser element is made of a bonded or sintered material or a sintered composite.

Preferably, the blowing agent comprises carbon dioxide, which is readily available, inexpensive and relatively harmless.

The small size of the passages for the flow of the mixed reactants (with $CO_2$) through the pressure reduction device formed by the diffuser element assists in maintaining the pressure in the system above the equilibrium pressure.

One of the problems with these small passages is chat if blockages occur then the foam produced can be of inferior quality or the blockage eventually stops the process.

A second objective of the present invention is to reduce the effect of these blockages in the foaming process.

A third object is to provide a system which enables the diffuser element to be cleaned and/or changed whilst foaming continues, and/or which enables backwashing of the diffuser element without requiring disruption of froth/foam production.

In order to meet the second objective, there is provided an apparatus for producing polymeric foam, having a device for pressure reduction of the combined reactants with the $CO_2$ in the form of a diffuser element, and a means which controls frothing and enables the pressure reduction device to be used for longer periods between down times.

In some embodiments, the apparatus can include means which permits backwashing of the diffuser element to take place.

In one embodiment, the latter means enables the diffuser element to be selectively displaced through 180° to enable the discharged material itself to provide backwashing.

Other embodiments can include means which enables the back-pressure to be selectively adjusted during foaming.

The latter means can be achieved by, for example, containing the diffuser material between a pair of support plates whose relative spacing can be adjusted to adjust the compression level of the diffuser material.

Still further embodiments can include means which enables cleaning of the diffuser element whilst foaming continues.

The latter means can be achieved, for example, by arranging for there to be at least two diffuser elements disposed in parallel, with the flow of reactive constituents thereto selectively controllable by a variable inlet flow path.

As explained hereinbefore, the diffuser element is preferably made of a sintered material, preferably of a metal such as stainless steel. However, the diffuser element can also be formed by containing between two spaced support or drain plates a particulate material, or a compressible fibre material such as steel wool.

The invention is described further hereinafter, by way of example only, with reference to the accompanying drawing, in which:

FIG. 3 is an enlarged exploded perspective view of a dispensing head of the apparatus of FIG. 1;

FIG. 4 is a perspective view of an alternative dispensing head which may be used wish the apparatus of FIG. 1;

FIG. 5 is a diagrammatic, longitudinal section through one possible embodiment of an adjustable area diffusion nozzle;

Figure 1:
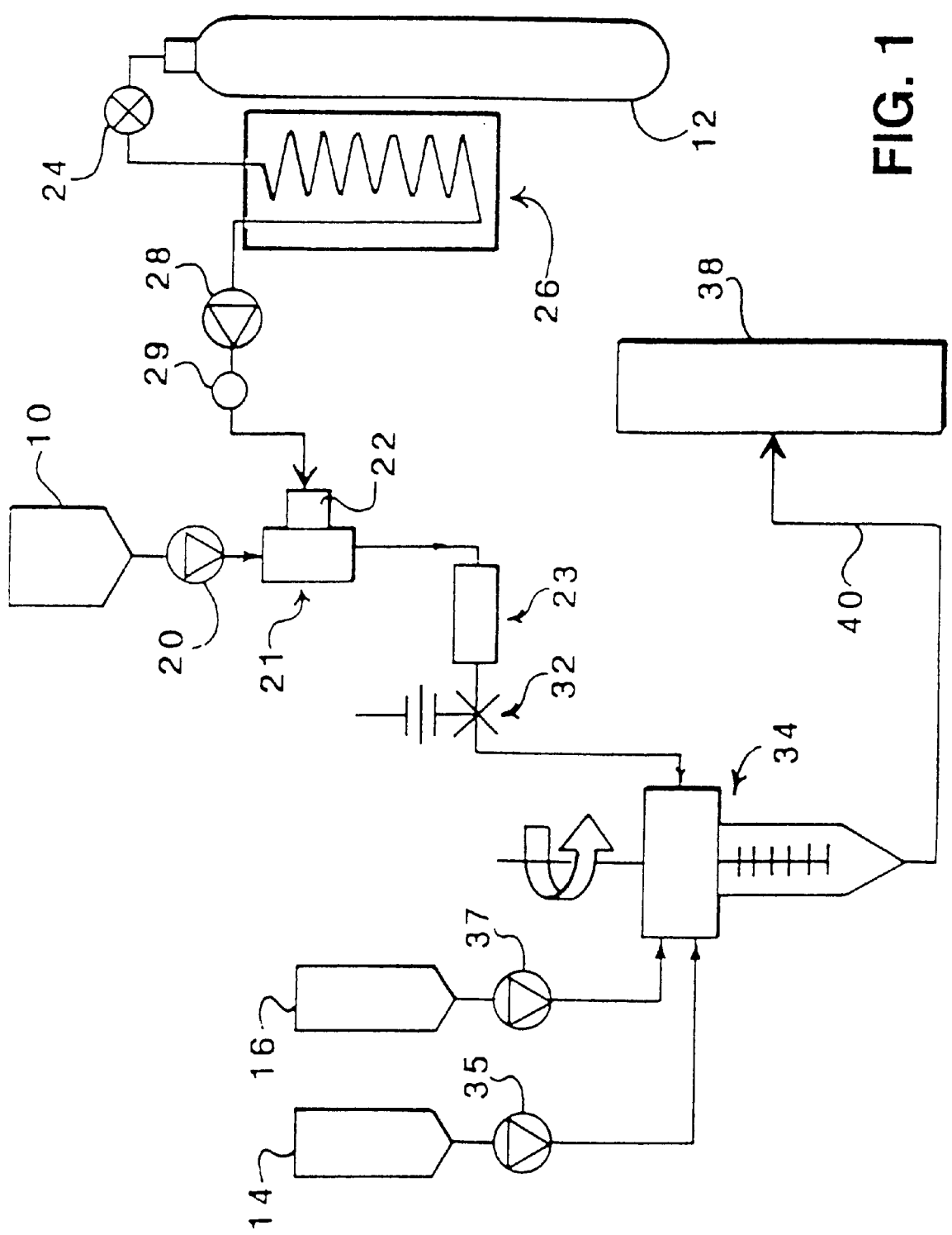
FIG. 1 is a diagrammatic illustration of an embodiment of apparatus and process for producing polymeric foam, in accordance with the present invention.
Figure 2:
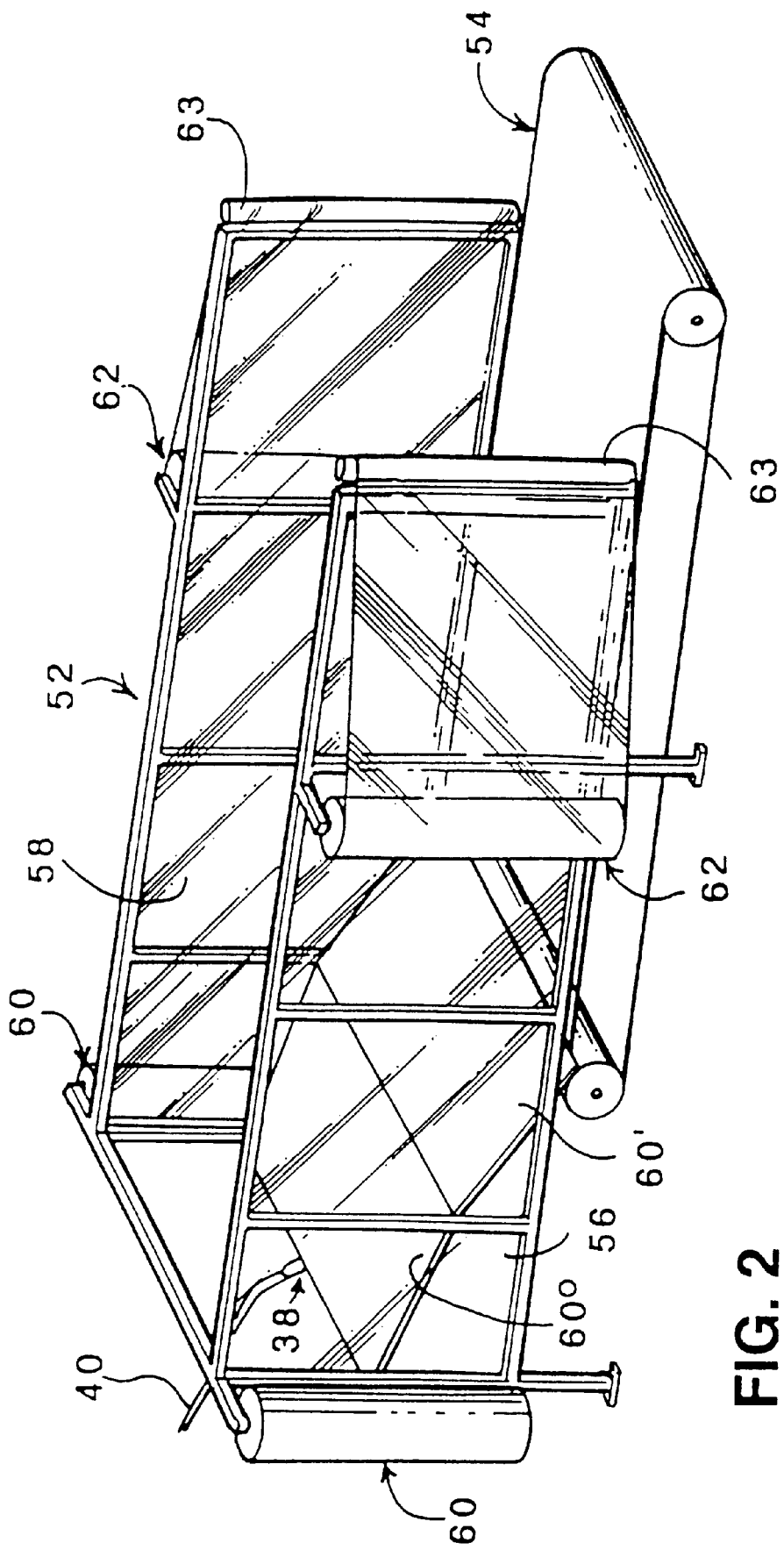
FIG. 2 is a perspective view of a first embodiment of apparatus for producing polymeric foam, in accordance with the present invention.

Referring firstly to FIG. 1, the apparatus comprises a first tank 10 for holding a polyol or polyol blend, a cylinder 12 for storing liquid carbon dioxide, a second tank 14 for holding TDI (an isocyanate) and a third tank 16 for holding a tin catalyst. The bulk $CO_2$ supply is preferably stored at constant temperature so that the $CO_2$ vapour pressure is also kept constant, advantageously at a low temperature, eg. $-5°$ to $-15°$ C. The polyol from tank 10 is fed via a pump 20 to an injector block 21 where it meets the liquid carbon dioxide which is injected through an injector 22. The liquid carbon dioxide is fed via a pressure regulator 24, a cooling unit 26, a feed pump 28, a non-return valve 29 and the injector 22. The polyol and $CO_2$ are then fed to a conventional static mixer 23, eg. a helical mixer. The mixed polyol and liquid carbon dioxide are fed via a pressure regulating valve 32 to a rotary mixer 34 where the polyol and carbon dioxide are mixed with the isocyanate and tin catalyst fed from the tanks 14 and 16 respectively by pumps 35, 37. In contrast to the prior art, the rotary mixer 34 can be operated at a relatively low rotation rate, for example 36 rpm.

The resultant mixture is fed, still under pressure, to an expansion system in the form of a discharge head 38 which is illustrated only schematically in FIG. 1.

The polyol blend can comprise polyol, water and amine. It has been found advantageous for the stabilisation of the froth to inject a silicone catalyst into the polyol, either before or immediately after the injector block 21.

The $CO_2$ can be mixed with either the polyol or polyol blend stream. The polyol blend stream can comprise of polyol plus water plus amine. It has been found advantageous for the stabilisation of the froth or a silicone catalyst to be injected into the polyol or polyol blend stream either before or immediately after the injection block 21 in FIG. 1.

It has also been found that the liquid $CO_2$ stream can be injected into the mixed reactant stream (including T.D.I.) before the diffuser element.

The discharge head 38 is illustrated in more detail in FIG. 3 and comprises a feed pipe 40 to which is secured an externally threaded tubular head 42. An internally threaded tubular retaining cap 44 is threadedly-engageable with the threaded head 42 and is adapted to retain a disc 46 of diffusing material, such as sintered wire. A seal 48 is interposed, in use, between the end face of head 42 and the periphery of the reverse surface of the sintered disc 46 and a further seal 50 in use is interposed between the periphery of the front face of the sintered disc and an O-ring 47 and an inwardly-directed flange 51 at the distal end of the cap 44. The purpose of the seals 48 and 50 is to prevent the pressurised mixture passing around the periphery of the sintered wire disc and to define the area of flow through the sintered wire.

The discharge head 38 is adapted to discharge the mixture into a generally conventional foam conveying apparatus 52 which, briefly, comprises an endless lower horizontal conveyor 54 and two vertical side walls 56,58. Each of the side wall conveyors comprises a plastics sheet which is drawn from a respective vertical storage roll 60 and back over a vertical end idle roller 63 by a driven vertical take-up roller 62. The movement of the take-up rollers 62 is synchronised with the drive of the conveyor belt 54, whereby the conveyor belt 54 and the two side wall conveyors 56, 58 move at approximately the same speed. At one end of the conveyor 52 a fixed wall 60 is provided having a lower planar inclined portion 60' extending to a position just above one end of the conveyor belt 54 and an upper planar inclined portion 60" contiguous with the lower inclined portion 60' and being inclined to the horizontal at a smaller angle than the first inclined portion 60'. The dispensing head 38 discharges the mixture onto the upper inclined portion 60" into a foaming volume defined by the conveyor belt 54, the two side wall conveyors 56,58, and the fixed wall 60.

In practice, in this embodiment, the liquid carbon dioxide, polyol blend, isocyanate and tin catalyst are mixed together by means of the static mixer 22 and the rotational mixer 34 and are fed under pressure to the discharge head 38 via the reed pipe 40 It is important to remember that as the mixture is fed to the discharge head 38 it is kept under a pressure sufficient to keep the carbon dioxide in a liquid state when mixed with the other chemical reactants, typically although not necessarily in excess of 10 bar. It has been found in practice that the pressure prior to the sinter should be over 14 bar and preferably over 18 bar. A further surprising result is that pressures between 20 bar and up to 35 bar prior to the sinter do not have any major detrimental effects on the cell structure and indeed may have positive effects. The mixture is then discharged through the porous sintered wire disc 46, the carbon dioxide vaporising to cause the mixture to froth. The frothing mixture then expands further by the production of carbon dioxide from the reaction between the isocyanate and the water and is removed from the area of the discharge head in the form of a continuously-formed block by means of the conveyor 52.

An alternative construction of discharge head is illustrated in FIG. 4, in which the head 64 is laterally elongate and positioned, in use, transversely with respect to the direction of motion of the conveyor 52. The discharge head 64 is rectangular in crosssection and a rectangular strip 68 of diffusing material, such as the sintered wire as described above, forms part of a side wall of the dispensing head. In this way, the mixture can be discharged through the sintered material more evenly over the entire width of the conveyor 52.

The invention is not restricted to the details of the foregoing embodiments. For example, the pressure drop across the diffuser element may be regulated by adjusting any or all of the dimension, shape, pore size and thickness of the element and/or the velocity of the mixture through the diffusing material.

In some cases, it may be necessary to include a supporting structure for providing rigid support for the diffusing material.

In a typical case, the thickness of the diffusing material is in the range 1–3 mm, dependent inter alia on the pore size of the diffusing material. Other types of foams, e.g. those which contain fillers or viscous materials, may need a larger pore size and increased thickness of diffusing material. In practice, the pore size used and the back pressure developed upstream of the diffusing material influence the ultimate cell structure of the resulting foam.

In order to prevent larger particles of matter, whether formed chemically or being extraneous particles which have gained entrance inadvertently to the system, from reaching and blocking the diffusing material, it can be advantageous to provide a filter medium within the system somewhere upstream of the diffusing material.

In some embodiments, it may be advantageous to incorporate a conventional doctor roller and adjustable pressure plates downstream of the discharge head for controlling the upper surface of the foam product.

It is emphasised thy whereas the above system has been described in connection with the formation of low density foams, it can be applied also to the production of standard and higher density foams.

Figure 7:
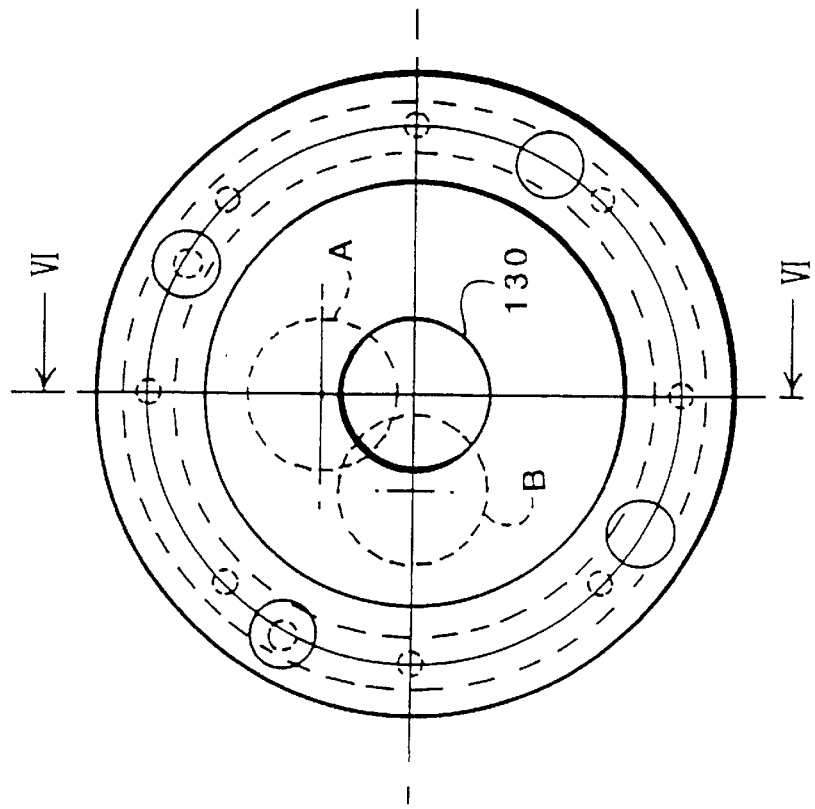
FIGS. 6 and 7 are diagrammatic side and front views of a second possible embodiment of adjustable area diffusion nozzle.
Figure 6:
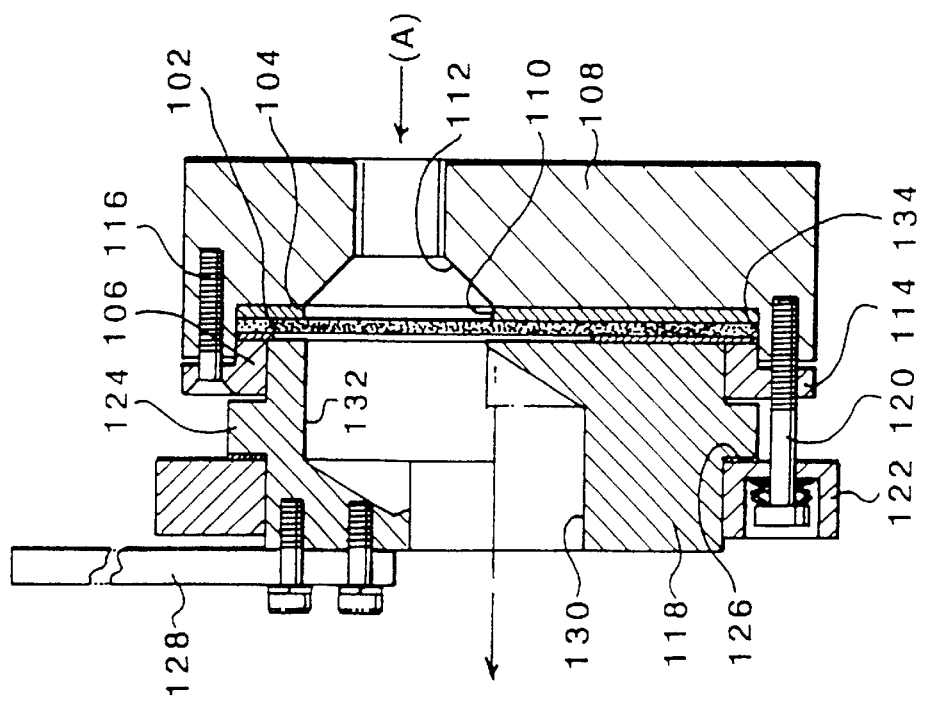

Turning now to FIG. 5 and FIGS. 6 and 7, there are shown two possible examples of diffuser element nozzles for use in the present invention, which have adjustable areas. Such devices can be manually or power driven and may if desired, be controlled by an automatic sensing device responsive to one or more operating characteristics or parameters Referring first to FIG. 5, the illustrated embodiment comprises a cylindrical diffuser element 80 made of diffusing material, such as the sintered wire described hereinbefore.

The cylindrical diffuser element 80 is held between two support plates 82a, 82b which are clamped against the axial ends of the element 80 by means of bolts 84. Reactant mixture is supplied via an elongate feed pipe 86 having a central bore 88 which communicates via transverse bores 90 with the interior of the cylindrical diffuser element 80. The feed pipe as a flanged end portion 92 which is a sliding fit within the cylindrical diffuser element and is sealed therewithin by an annular O-ring 94. By virtue of the seal 94, the mixture is confined to the region within the diffuser element to the right of the flanged head 92 as viewed in FIG. 5. Thus, by relative axial displacement of the feed pipe and cylindrical diffuser element 80, the effective operational area of the diffuser element can be correspondingly increased or decreased.

Referring now to FIGS. 6 and 7, the second embodiment of variable area diffuser element comprises a circular disc 102 of diffusing material, such as sintered wire, which is mounted between two compression gaskets 104, 106 in a fixed housing 108. The first gasket 104 has the same diameter as the disc 102 but an eccentric circular hole 110 aligned with a frusto-conical inlet passage 112 defined in the housing 108. The second gasket 106 is annular and compressed against the outer periphery of the disc 102 by a retaining ring 114 and screws 116. A second housing part 118 is mounted so as to be rotatable relative to the housing 108 about the central axis X. This is achieved by coupling the part 118 to the housing 108 by means of fixing screws 120 and a second, spring-loaded retaining ring 122 which engages against a flange 124 of the housing oars 118 with at least one of the engaging surfaces carrying a Teflon (RTM) coating 126. A handle 128 is provided in this example for rotating the housing part 118.

As best seen in FIG. 6, the rotatable housing part 118 has an axial outlet bore 130 at its one side which communicates with an eccentric bore 132 at its other side. The surface of the housing part 118 facing the diffusing disc 102 carries a Teflon coating 134 which enables the part 118 to slide over the diffusing disc 102 when the part 118 is rotated relative to the housing 108 by means of the handle 128.

As evident from FIG. 7, the housing part 118 can be moved selectively between a position in which the outlet bore 132 is fully aligned with the inlet passage 112 (shown by dotted ring A in FIG. 7) to a position in which the outlet bore 132 is out of alignment with the inlet passage 112 corresponding to some prescribed minimum overlap (such as shown by dotted ring B in FIG. 7). In this way, the extent of overlay of the inlet and outlet passages can be selected so as to vary the effective area of the diffuser between maximum and minimum values.

Reference is now made to FIGS. 8 to 18, in which identical and similar components in the various figures are given the same reference numerals.

FIGS. 8 to 11 show a device with multiple pressure reduction (diffuser element) devices ($C_1$ and $C_2$). The object in this embodiment is that if one diffuser element becomes blocked, it is possible to change to another element without disrupting the process.

A diffuser element which has become blocked may be removed for cleaning or it may be cleaned "in-situ" by means of back flushing with suitable medium. The cleaned element is then made ready for a further change over into the production process when the currently foaming device becomes blocked. By this means the duration of the foaming process is not limited by the life of the pressure reduction device (diffuser element).

The reactive chemicals enter the device at connection point (A) and pass along a hollow piston 110 to a first pressure reduction device ($C_1$), for example of the type shown at 46 in FIG. 3 and comprising a foaming device 130 mounted in a nozzle 13. The piston 110 is slidably mounted in the body 112 of a valve 114 and is coupled to the valve body 112 by means of a powered linear actuator 116. The valve 114 is preferably attached to the foam machine by means of a bracket (not shown) clamped to an extension of the piston 110. This has the advantage that the body 112 of valve 114 moves axially relative to the piston 110 to bring a second pressure reduction device (diffuser element) ($C_2$) into exactly the same position relative to the foam machine as the original device ($C_1$)

If the apparatus is to be configured to enable the removal of the pressure reduction devices ($C_1$ and $C_2$) for cleaning, then they can be located in removable blocks 120 which are held in position in a nozzle clamp 122 by screws 124.

Figure 8:
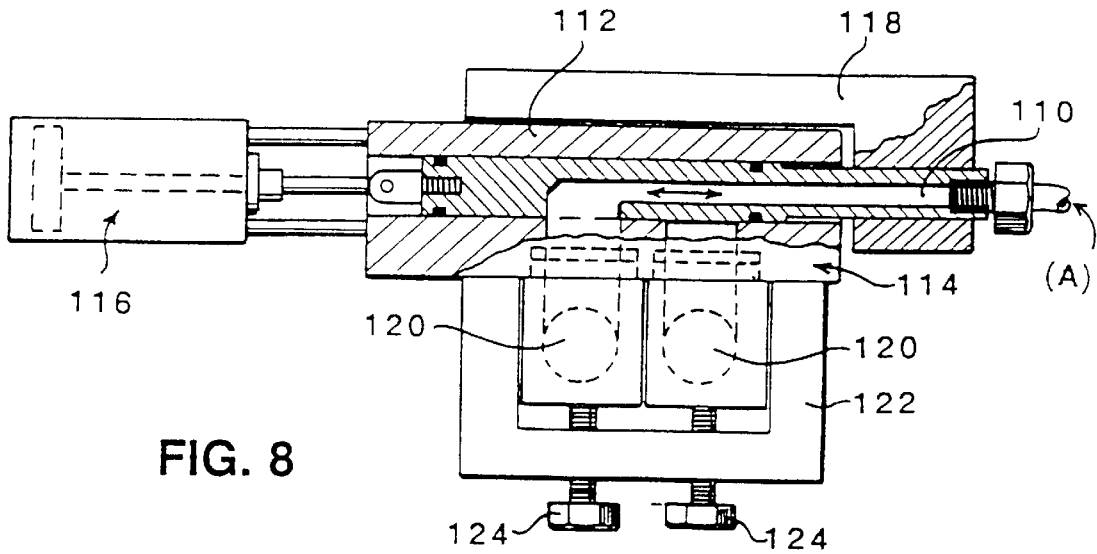
FIGS. 8 to 10 are sectional side, top and end views of a first embodiment of a quick-change foaming device in accordance with the present invention.
Figure 9:
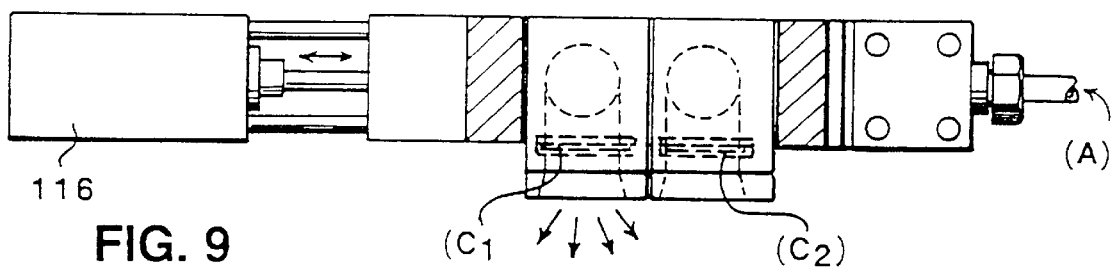
Figure 10:
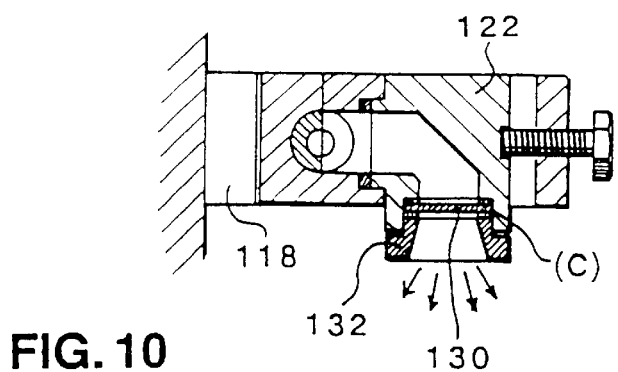
Figure 11:
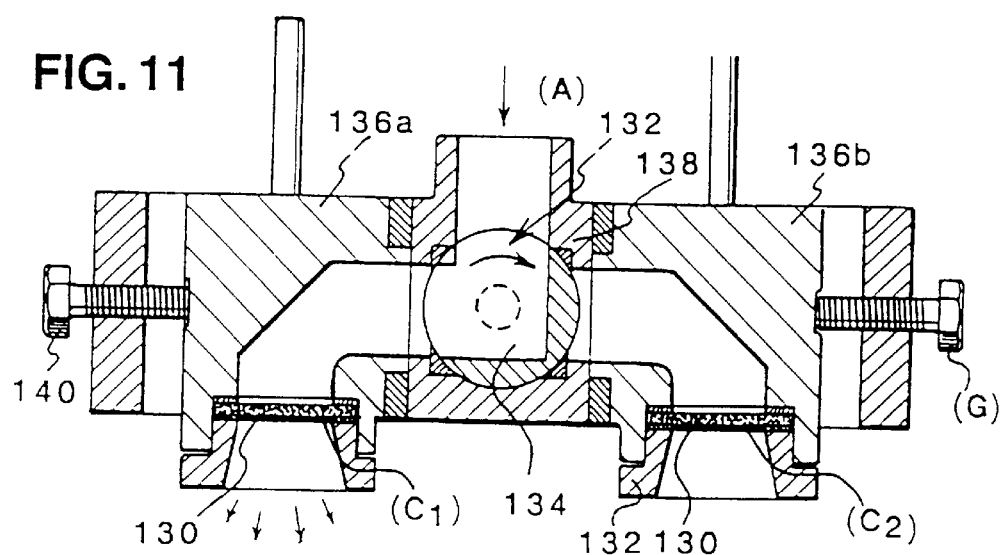
FIGS. 11 to 13 are sectional side, top and end views of a second embodiment of quick-change foaming device in accordance with the present invention.
Figure 12:
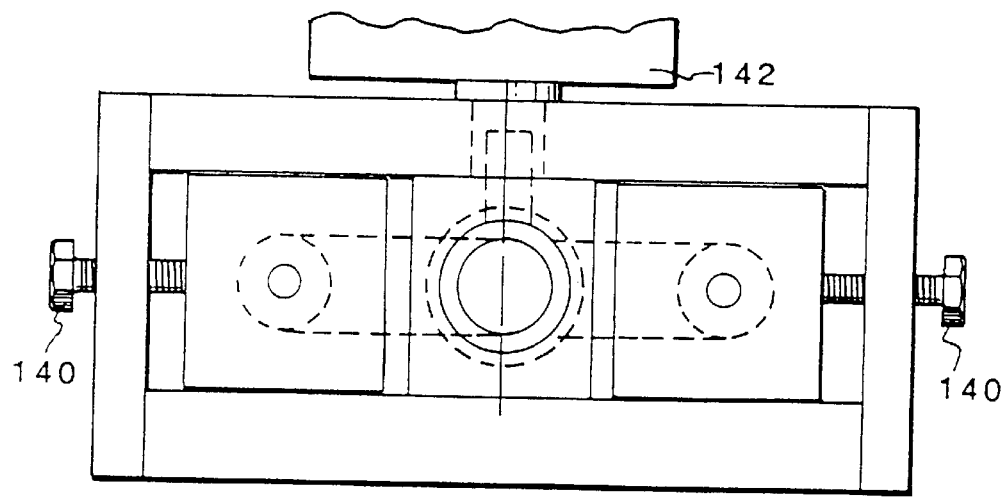
Figure 13:
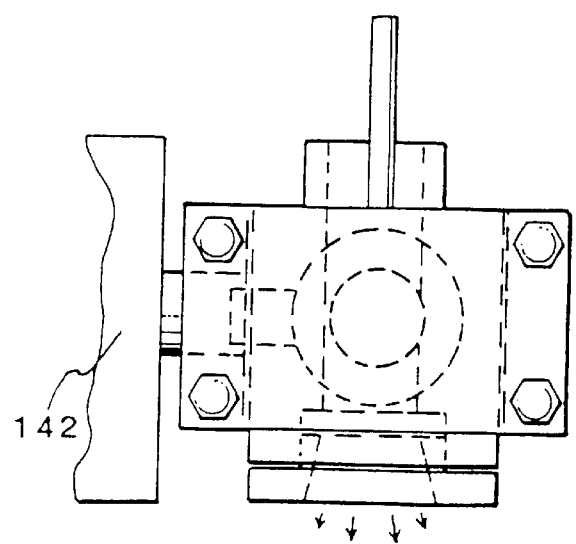

FIGS. 11 to 13 show a variation of the principles of the device described in FIGS. 8 to 10. In the device of FIGS. 11 to 13 the chemicals enter into a 3-way diverter ball valve 132 and the two alternate pressure reduction devices (diffuser elements) ($C_1$ and $C_2$) are attached to the outlet ports of the valve. The chemicals enter the device at connection point (A) and into the ball 134 of the valve 132. Individually releasable blocks (F) 136a, 136b, into which are respectively mounted two pressure reduction devices ($C_1$ and $C_2$), are clamped to the body 138 of the valve 132 by means of screws 140. Depending upon the orientation of the valve ball 134, either the device ($C_1$ or $C_2$) is in production and the other one may be removed for cleaning. The ball 134 of the valve is actuated through 90° rotation by a rotary actuator 142.

Figure 14:
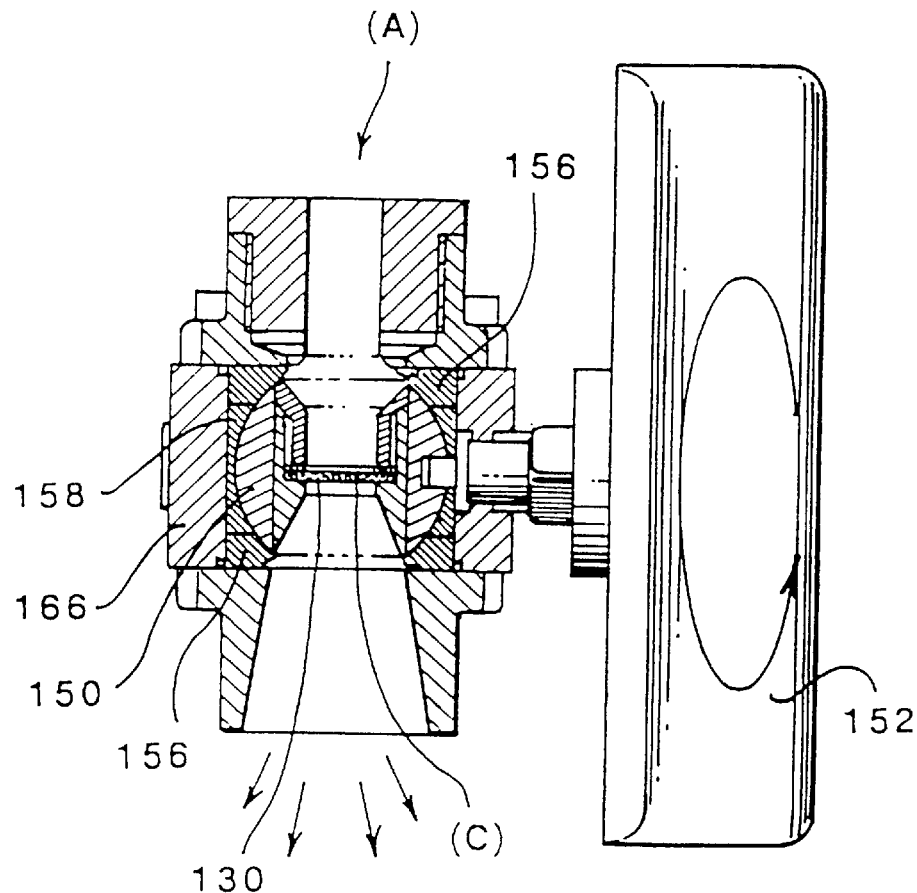
FIGS. 14 and 15 are sectional side and plan views of a self-cleaning foaming device in accordance with the present invention.
Figure 15:
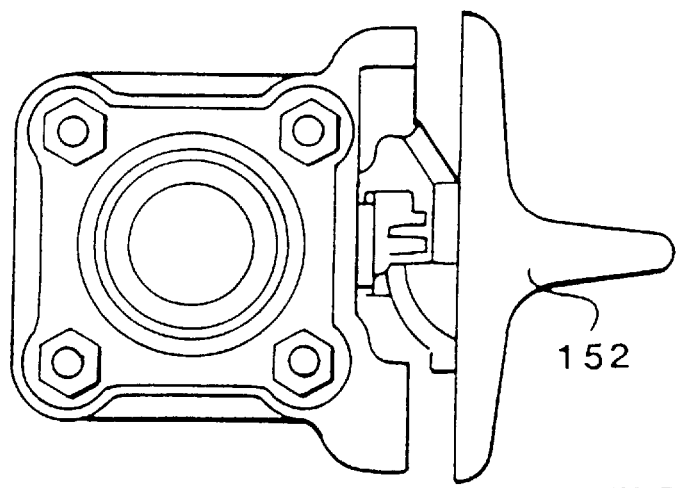

FIGS. 14 and 15 show a device with a single pressure reduction (diffuser element) device (C) mounted within the passage of a ball 150 of a special high pressure ball valve. The object of the device is to rotate the pressure reduction device (C) through 180° whilst in operation so that the flow of chemical is reversed, producing a self cleaning effect by back flushing with the production chemicals.

This device allows continuous production of foam using only one pressure reduction device (C) and provides a means of continuous cleaning. The chemicals enter the device at connection point (A), passing through the ball 150 and the pressure reduction device (C) to the outlet. The ball is actuated within a valve body 166 by a rotary actuator 152 through an angle of 180° so that its previous discharge side then becomes the entry side.

Reference numeral 154 denotes a clamping nut; 156 denotes ball seats; and 158 denotes valve cavity fillers.

Figure 16:
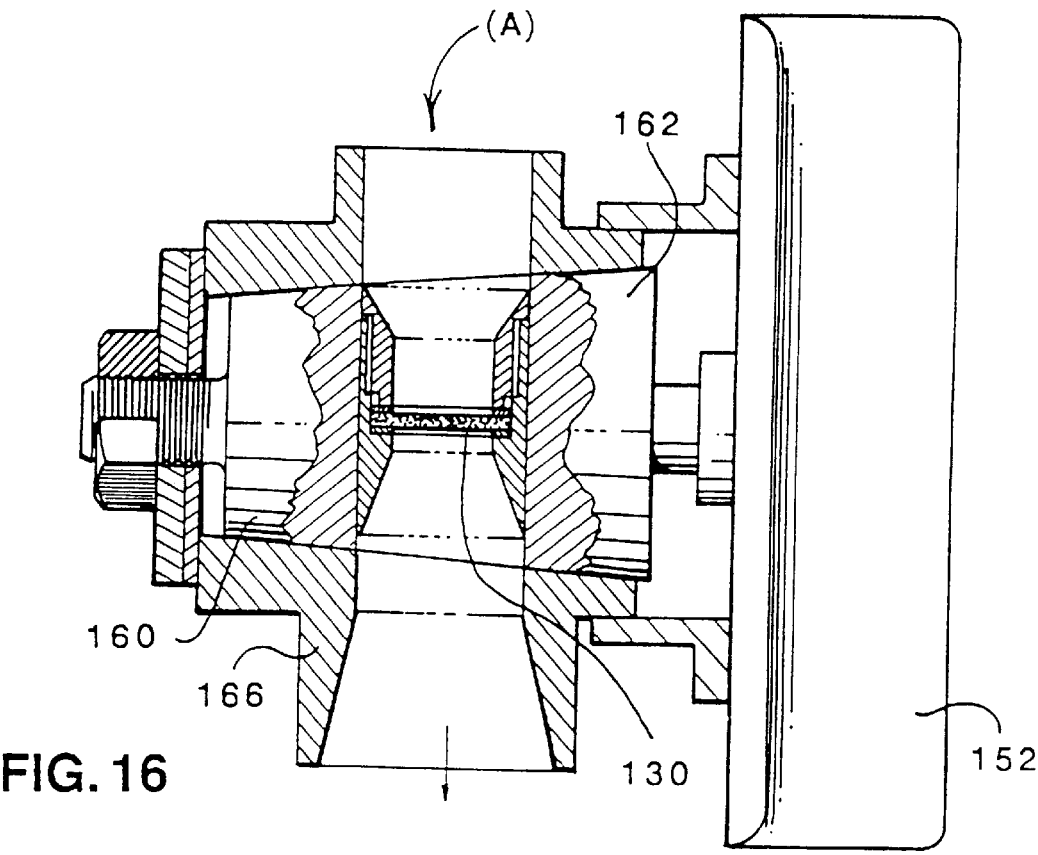
FIG. 16 is a sectional side view of another embodiment of self-cleaning foaming device in accordance with the present invention.

FIG. 16 shows an alternative embodiment of the principles of FIGS. 14 and 15 in which a taper or cylindrical plug type valve 162 is used instead of a ball valve to house the pressure reduction device (C) The description of the device c FIG. 16 is similar to that of FIGS. 7 and 8 except that the ball is replaced by the plug 160.

Figure 17:
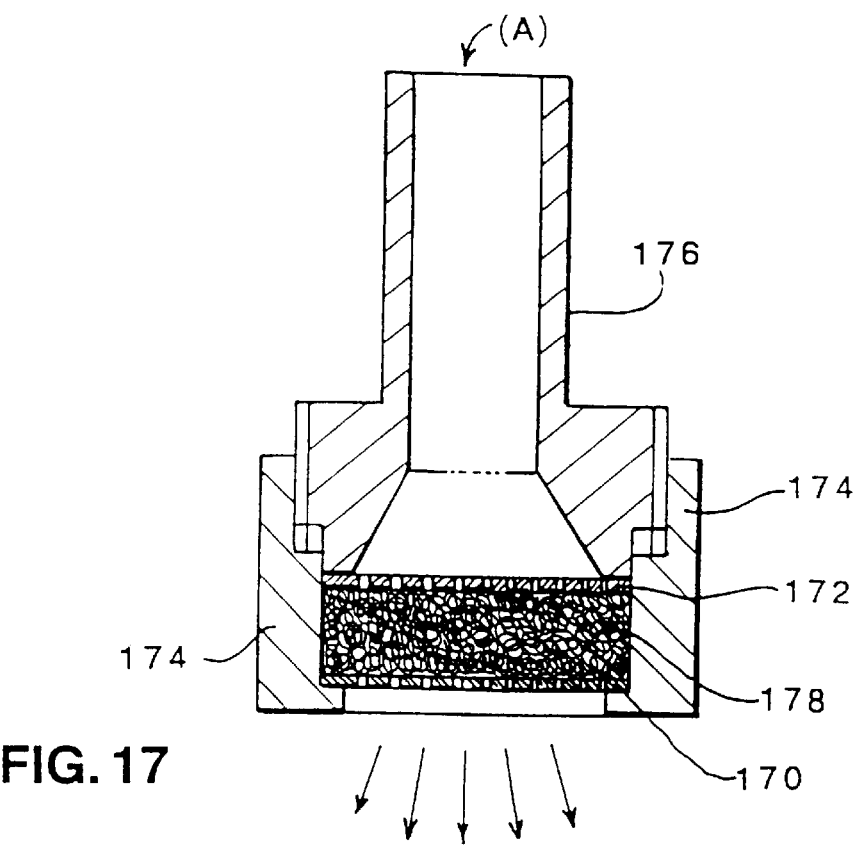
FIG. 17 is a sectional view of a further embodiment using a different construction of diffuser means.

FIG. 17 illustrates another device that can be employed. This consists of two support or drain plates 170, 172 mounted inside a nozzle holder cap 174 that is fitted to the end of the pressure reduction holder 176. The space between the two support plates 170, 172 is filled with compressible fibre or steel wool 178. The plates 170, 172 have passages which permit the flow of the reactants through them without causing too high a pressure drop. The back pressure is maintained by the compression of the fibres 178. With this arrangement, as the back pressure increases due to partial blockage, the pressure reduction holder can be unscrewed slightly, thereby reducing the back pressure.

The holder cap 174 is fitted with the drain plate 170 in the bottom. On the top of the drain plate 170 is placed the pressure reduction material 178. The top drain plate 172 is placed above the pressure reduction material 178. The holder cap 174 is then screwed onto the reactant delivery tube 176. The quantity of pressure reduction material and the degree of compression achieved by screwing the holder cap 174 onto the reactant tube 176 determine the back pressure for the flow.

Powders can also be used to fill the space between the support plates 170, 172. The pressure reduction unit of FIG. 17 could also be enjoyed in the devices illustrated in FIGS. 8 to 16.

Figure 18:
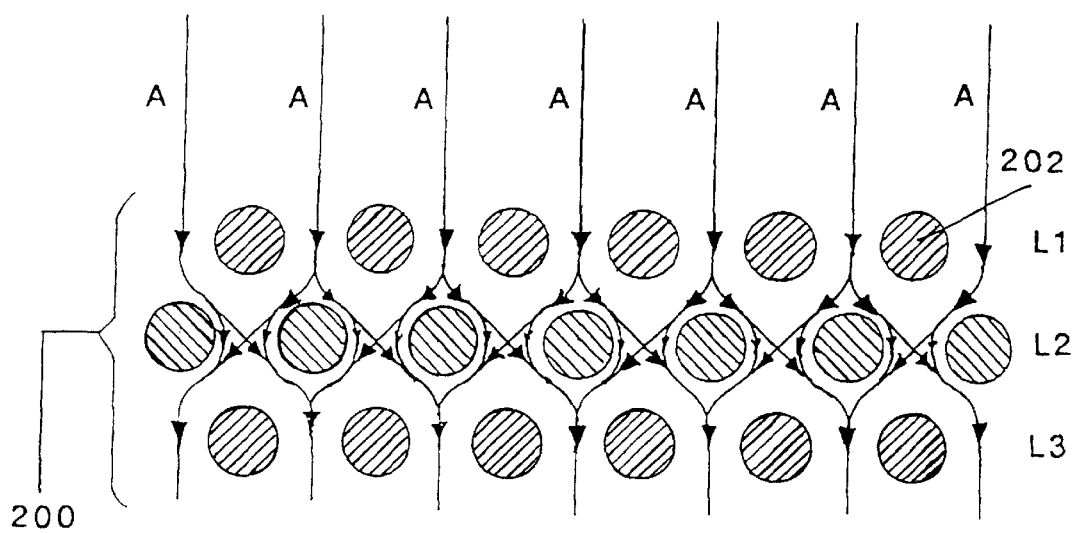
FIG. 18 diagrammatically illustrates divergent and convergent flow paths as can be used in the present invention.

Referring finally to FIG. 18 there is illustrated highly diagrammatically how the reactant mixture flow inlet paths A diverge and converge around individual particles or strands 202 of the material of the diffuser element 200. As illustrated this diffuser element has just three layers $L_1$, $L_2$ and $L_3$. Although they appear separated in FIG. 18, in practice the individual particles or strands 202 would of course be joined at junction points, for example by fusing. Also, it should be emphasised that FIG. 18 shows only the divergence and convergence of flow paths in one plane, in two dimensions. In practice further divergence and convergence would occur into planes above and below the plane of FIG. 18, ie the divergence and convergence would occur in 3-dimensions.

We claim:

1. An apparatus for producing a polymeric foam, comprising:

means for bringing together a reactive foam component and a low-boiling point frothing agent under sufficient pressure to maintain the frothing agent in a liquid state; and a permeable discharge head comprising at least one diffuser element comprising at least two layers of wire mesh sintered together forming a unitary structure wherein the layers are fused together by the sintering process at their points of contact with each other, wherein said component and agent are discharged from the discharge head forming froth.

2. A process for producing polymeric foam comprising the steps of:

bringing together a reactive foam component and a low-boiling point frothing agent;

applying pressure to maintain the frothing agent in a liquid condition; and mixing the component and agent by discharging the component and agent through a permeable discharge head to form a froth, the discharge head comprising at least one diffuser element comprising at least two layers of wire mesh sintered together, wherein points of contact between meshes are fused together by the sintering process forming dividing, converging and diverging flow paths within the axial thickness of the diffuser element in the direction of flow therethrough.

3. An apparatus as claimed in claim 1, wherein the wire mesh layers are made of metal.

4. An apparatus according to claim 1 further comprising means which permits backwashing of said at least one diffuser element.

5. An apparatus according to claim 4, wherein the backwashing enabling means is adapted to allow said at least one diffuser element to be selectively displaced through 180° to enable discharged material itself to provide backwashing.

6. An apparatus according to claim 5, wherein the diffuser element is held in a rotary member of a rotary valve, said rotary member being selectively rotatable by means of a rotary actuator to invert the diffuser element relative to the flow path through the valve.

7. An apparatus according to claim 1 further comprising means for enabling cleaning of the diffuser element while forming froth.

8. An apparatus according to claim 1 further comprising:
means for controlling the flow of said component and agent to the discharge head; and
at least two diffuser elements disposed in parallel.

9. An apparatus according to claim 1 further comprising means for varying the effective area of the diffuser.

10. An apparatus according to claim 1, wherein the thickness of said unitary structure of sintered wire mesh layers lies in the range of 1–3 mm.

11. A process for producing polymeric foam according to claim 2 further comprising the step of mixing said reactive components and said low-boiling point frothing agent upstream of said discharge head with a static mixer and a rotary mixer.

12. A process for producing polymeric foam according to claim 2 further comprising the step of mixing said reactive components and said low-boiling point frothing agent upstream of said discharge head with a static mixer only.

13. A process for producing polymeric foam according to claim 2 further comprising the step of mixing said reactive components and said low-boiling point frothing agent upstream of said discharge head with a rotary mixer means only.

14. A process for producing polymeric foam according to claim 2 wherein the low-boiling point frothing agent is $CO_2$.

15. A process according to claim 14 further comprising the step of introducing said $CO_2$ frothing agent upstream of said discharge head into a stream of said reactive foam components.

16. A process according to claim 2 further comprising the steps of:
introducing said low-boiling point frothing agent via an injector block into a stream selected from the group of streams consisting of a polyol stream and a polyol blend stream; and
injecting a silicone catalyst into said stream.

17. A process according to claim 16 wherein the injecting step comprises injecting a silicone catalyst into said stream before the injection block.

18. A process according to claim 16 wherein the injecting step comprises injecting a silicone catalyst into said stream immediately after said injection block.

19. A process for producing polymeric foam according to claim 2 wherein said reactive foam component and said low boiling point frothing agent are not subjected to mixing by way of a static or rotary mixer upstream of said discharge head.

* * * * *